Patented Mar. 3, 1936

2,032,520

UNITED STATES PATENT OFFICE 2,032,520

CHLORO SUBSTITUTED DIBENZOYLAMINO ANTHRIMIDE COMPOUNDS

Alexander J. Wuertz, Carrollville, and Myron S. Whelen, Milwaukee, Wis., assignors to E. I. du Pont de Nemours & Company, Wilmington, Del., a corporation of Delaware No Drawing. Application June 22, 1934, Serial No. 731,884

7 Claims. (Cl. 260—46)

This invention relates to the preparation of new chlorine substituted benzoylamino anthrimides of the general formula

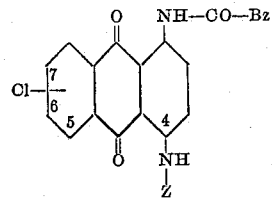

wherein Bz stands for a radical of the benzene series, Z stands for an alpha-benzoylamino-anthraquinonyl group attached to the N-atom in an alpha position and the Cl occupies the 5, 6 or 7 position.

In our copending application Ser. No. 731,882, we have described the preparation of new benzoylamino-4,5-, 4,6- and 4,7-dichloro-anthraquinone compounds. These compounds, prepared by chlorination of the corresponding 1-benzoylamino-5-, 6-, or 7-chloro-anthraquinones, have been found to give valuable intermediates for dyestuffs when condensed with amino-benzoylamino-anthraquinone compounds. The present invention, therefore, relates to the condensation of these dichloro - benzoylamino - anthraquinones, with amino-benzoylamino-anthraquinones in equal molecular proportions to give dibenzoylamino - anthraquinonylamino - anthraquinones, generally referred to as anthrimides, which contain chlorine in one or both of the anthraquinone molecules.

The present invention also contemplates the further condensation of these dianthrimides with an acid condensing agent such as sulfuric acid, aluminum chloride, etc., to convert them into valuable dyestuffs of the series often referred to as diphthaloyl-carbazoles, which dye cotton in brown shades.

The condensation of the chloro-benzoylamino-anthraquinone and the amino-benzoylamino-anthraquinone is carried out by the process usually employed for the preparation of anthrimides. Where the 4,6- or 4,7-dichloro-1-benzoylamino-anthraquinone is used, condensation takes place chiefly in the 4 position, thereby giving a chloro substituted anthrimide which is yellower in shade than the similar compound containing no chlorine. Where the 4,5-dichloro-1-benzoylamino-anthraquinone is used, condensation takes place chiefly in the 4 position, although it is possible in this case that some condensation in the 5 position is also effected. The principal product of the reaction, however, is the 5-chloro-substituted dianthrimide, which is also somewhat yellower than the corresponding product containing no chlorine. Any benzoylamino-anthraquinone containing a free amine group may be used in this condensation, although we prefer to use alpha, alpha-monobenzoylamino-diamino-anthraquinones, such as monobenzoylamino-1,4-, 1,5- and 1,8-diamino-anthraquinones, 1-benzoyl-amino-4-amino-6- or 7-chloro or other chloro substituted amino-anthraquinones.

The following examples are given to more fully illustrate our invention. The parts used are by weight.

Example 1

10 parts of monobenzoyl-1,5-diamino-anthraquinone and 11.7 parts of 1-benzoylamino-4,6-dichloro-anthraquinone (prepared by the chlorination of 1-benzoylamino-6-chloro-anthraquinone in an organic solvent such as nitrobenzene or dichlorobenzene, acetic acid and sodium acetate) are suspended in 117 parts of nitrobenzene. Thereto are added 10 parts of sodium carbonate and a small amount of a copper salt such as cupric chloride. The mass is then heated at a temperature of about 200° C. for about nine hours. The reaction mass is then cooled and the chloro - dibenzoylamino - anthraquinonylamino - anthraquinone is separated by a steam distillation, or it may be obtained in a somewhat purer form by filtration, or by addition of an organic solvent such as solvent naphtha or alcohol followed by filtration. The anthraquinonylamino-anthraquinone body so formed is a dark violet powder, dissolving in sulphuric acid with a green coloration.

1-benzoylamino-4,7-dichloro-anthraquinone may be substituted in this example for the 1-benzoylamino-4,6-dichloro-anthraquinone, and gives a product similar to that obtained with the 4,6 isomer.

Example 2

10 parts of monobenzoyl-1,5-diamino-anthraquinone and 11.7 parts of 1-benzoylamino-4,5-dichloro-anthraquinone (prepared by the chlorination of 1 - benzoylamino-5-chloro-anthraquinone) are suspended in 117 parts of nitrobenzene. Thereto are added 10 parts of sodium carbonate and a small amount of a copper salt such as cupric chloride. The mass is then heated at a temperature of about 200° C. for about six hours. The chloro-dibenzoylamino-anthraquinonylamino-anthraquinone so formed may be separated by first diluting with a solvent followed by filtration, or it may be obtained in a somewhat impurer form by steam distillation of the reaction mass. It is a dark violet colored powder, dissolving in concentrated sulphuric acid with a green coloration.

*Example 3*

10 parts of 1 benzoylamino-4-amino-6-chloro-anthraquinone (prepared by the mono-amidation of 1 - benzoylamino-4,6-dichloro-anthraquinone with p-toluyl-sulfonamide) and 10.5 parts of 1-benzoylamino-4,6-dichloro-anthraquinone are suspended in 130 parts of nitrobenzene. Thereto are added 10 parts of sodium carbonate and a small amount of a copper salt, such as cupric chloride. The whole is then heated together at a temperature of about 200° C. for about eight hours. The dichloro - dibenzoylamino-anthraquinonylamino-anthraquinone may be isolated by steam distillation or by dilution of the reaction mass with an organic solvent followed by filtration. The product is a dark colored powder dissolving in concentrated sulphuric acid with a green coloration.

*Example 4*

10 parts of monobenzoyl-1,5-diamino-anthraquinone and 11.7 parts of a mixture of 1-benzoylamino-4,6-dichloro-anthraquinone and 1 - benzoylamino-4,7-dichloro-anthraquinone are suspended in 130 parts of nitrobenzene. Thereto are added 10 parts of sodium carbonate and a small amount of a copper salt such as cupric chloride. The mass is then heated at a temperature of about 200° C. for about six hours. The mixed chloro-dibenzoylamino - anthraquinonylamino - anthraquinones so formed may be isolated by first diluting with a suitable organic solvent followed by filtration, or it may be obtained in a somewhat less pure form by steam distillation of the reaction mass. It is a dark colored powder, dissolving in concentrated sulphuric acid with a green coloration.

*Example 5*

10 parts of the chloro-dibenzoylamino-anthraquinonylamino-anthraquinone (prepared by the condensation of monobenzoyl-1,5-diamino-anthraquinone with 1-benzoylamino-4,6-dichloro-anthraquinone (Example 1)) are dissolved in 150 parts of concentrated sulphuric acid of 95–100% strength at 10° C. The temperature is allowed to rise with stirring to room temperature and ring-closure of the anthrimide to the carbazole takes place. When complete the mass is drowned in a large volume of cold water. The dyestuff so obtained may be conveniently purified at this stage by the addition of sodium or potassium dichromate followed by heating. The product so obtained is a brown powder dissolving in concentrated sulphuric acid with a brown coloration. It dyes cotton yellowish brown from a reddish brown vat.

*Example 6*

10 parts of the chloro-dibenzoylamino-anthraquinonylamino-anthraquinone (prepared by the condensation of monobenzoyl-1,5-diamino-anthraquinone with 1-benzoylamino-4,5-dichloro-anthraquinone (Example 2)) are dissolved in about 150 parts of concentrated sulphuric acid of 95–100% strength, at about 10° C. The temperature is then allowed to rise while stirring to room temperature and ring-closure of the anthrimide to the carbazole takes place. When complete the mass is drowned in a large volume of cold water. The dyestuff so obtained may be conveniently purified at this stage by oxidation with sodium or potassium dichromate. The product so obtained is a brown powder which dissolves in concentrated sulphuric acid with a brown coloration. It dyes cotton yellowish brown shades from a reddish brown vat.

Benzoylamino-anthraquinone compounds in which the benzoyl group contains simple substituents such as halogen, nitro and methyl groups may be used in place of the unsubstituted compounds.

As stated above, the condensation of the amino- and chloro-anthraquinone bodies may be effected by the methods generally employed for the preparation of anthrimides. Any inert high-boiling organic solvent may be used, and sodium acetate or other acid binding agent may also be used in place of the sodium carbonate specifically mentioned in the examples.

Ring-closure of all of the dianthrimide compounds produced according to this invention may be brought about by the use of concentrated sulphuric acid at relatively low temperatures, as more specifically illustrated in Examples 5 and 6, and give compounds which dye cotton in varying shades of brown. The final oxidation of the ring-closed products for the purpose of converting them to the keto form and to effect some purification, may be carried out by the use of any desired oxidizing agent disclosed in the prior art in the preparation of this class of vat dyestuffs.

Although these ring-closed anthrimide compounds are believed to be diphthaloyl-carbazoles, their exact constitution has not been proven with certainty and we therefore do not wish to be limited by any particular theory which may be advanced regarding the constitution of the final dyestuffs, or by any name which may be used to identify them.

What we claim is:

1. The process which comprises condensing an alpha-benzoylamino-substituted alpha-amino-anthraquinone with a compound of the formula

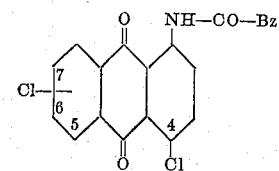

wherein Bz stands for a radical of the benzene series and the second Cl atom is present in the 5, 6 or 7 position in equal molecular proportions; treating the product so obtained in sulfuric acid and subjecting the resulting compound to oxidation.

2. A process for preparing benzoylamino-chloro-substituted anthrimides which comprises condensing an alpha-benzoylamino substituted alpha-amino-anthraquinone with a compound of the formula

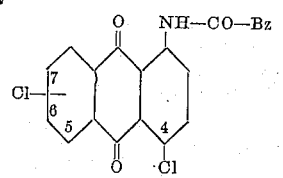

wherein Bz stands for a radical of the benzene series and the second Cl atom is present in the 5, 6 or 7 position in equal molecular proportions.

3. Benzoylamino chloro substituted anthrimides of the formula

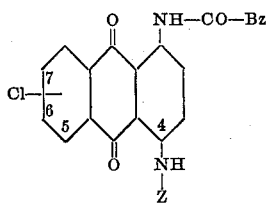

wherein Bz stands for a radical of the benzene series, Z represents an alpha-benzoylaminoanthraquinone radical connected to the N atom in alpha position, and the atom of chlorine is present in the 5, 6 or 7 position.

4. Compounds obtained by the process described in claim 1.

5. The dyestuff obtainable by the sulfuric acid condensation of the anthrimide of the formula:

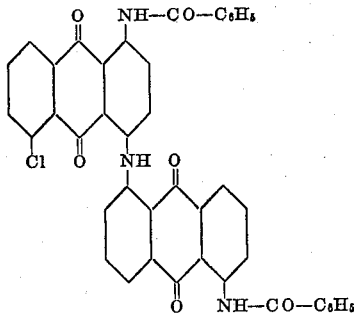

with subsequent treatment of the condensation product with an oxidizing agent.

6. The dyestuff obtainable by the sulfuric acid condensation of the anthrimide of the formula:

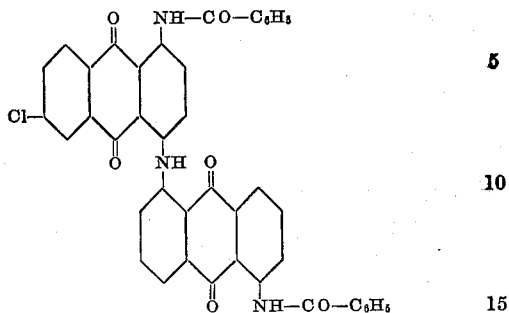

with subsequent treatment of the condensation product with an oxidizing agent.

7. The dyestuff obtainable by the sulfuric acid condensation of the anthrimide of the formula:

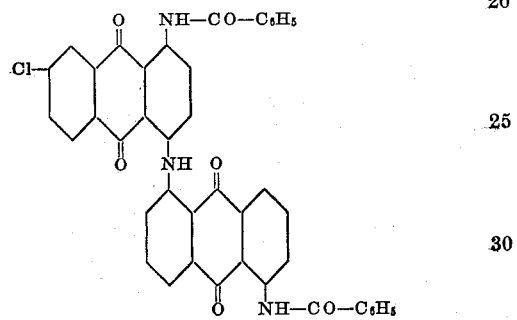

with subsequent treatment of the condensation product with an oxidizing agent.

ALEXANDER J. WUERTZ.
MYRON S. WHELEN.